United States Patent
Li et al.

(10) Patent No.: US 8,868,348 B2
(45) Date of Patent: Oct. 21, 2014

(54) WELL CONSTRAINED HORIZONTAL VARIABLE H-V CURVE CONSTRUCTING METHOD FOR SEISMIC WAVE VELOCITY FIELD CONSTRUCTION

(75) Inventors: Yalin Li, Sichuan (CN); Guangmin Hu, Sichuan (CN); Guangming He, Sichuan (CN); Jun Wu, Sichuan (CN); Dongshan Huang, Sichuan (CN); Qiubo Wu, Sichuan (CN); Wanxue Xie, Sichuan (CN)

(73) Assignee: China National Petroleum Corporation, Beijing (CN)

( * ) Notice: Subject to any disclaimer, the term of this patent is extended or adjusted under 35 U.S.C. 154(b) by 310 days.

(21) Appl. No.: 13/273,096

(22) Filed: Oct. 13, 2011

(65) Prior Publication Data

US 2012/0053841 A1    Mar. 1, 2012

Related U.S. Application Data

(63) Continuation of application No. PCT/CN2010/000145, filed on Feb. 2, 2010.

(30) Foreign Application Priority Data

Apr. 13, 2009    (CN) .......................... 2009 1 0058920

(51) Int. Cl.
*G01V 1/00* (2006.01)
*G01V 1/30* (2006.01)

(52) U.S. Cl.
CPC ........ *G01V 1/303* (2013.01); *G01V 2210/6652* (2013.01)
USPC .......................................................... 702/18

(58) Field of Classification Search
CPC ..................................................... G01V 1/282
USPC ............................................................ 702/18
See application file for complete search history.

(56) References Cited

U.S. PATENT DOCUMENTS

| | | | |
|---|---|---|---|
| 6,185,512 B1 * | 2/2001 | Lambrecht | 702/97 |
| 6,502,038 B1 | 12/2002 | Lazaratos et al. | |
| 6,864,890 B2 | 3/2005 | Meek et al. | |
| 2007/0247973 A1 | 10/2007 | Robinson et al. | |

FOREIGN PATENT DOCUMENTS

WO    WO 2009/005940    1/2009

\* cited by examiner

*Primary Examiner* — Stephen Cherry
(74) *Attorney, Agent, or Firm* — Brinks Gilson & Lione

(57) ABSTRACT

A well constrained transverse variable height-velocity curve constructing method for seismic wave velocity field construction involves the steps of: a) calculating interval velocity of each stratum by a sonic logging curve, and calculating the conversion horizon velocity of each horizon; b) drawing a circle to collect well points; c) calculating the characteristic parameter values of the height-velocity curve by the interval velocity and the conversion interval velocity of each well; d) calculating the characteristic parameter values by Kriging interpolation.

3 Claims, 4 Drawing Sheets

WELL CONSTRAINED HORIZONTAL VARIABLE H-V CURVE CONSTRUCTING METHOD FOR SEISMIC WAVE VELOCITY FIELD CONSTRUCTION

CROSS-REFERENCE TO RELATED APPLICATIONS

This application is a continuation of International Application No. PCT/CN2010/000145, filed on Feb. 2, 2010, which claims the benefit of Chinese Patent Application No. 200910058920.8, filed Apr. 13, 2009. The disclosures of the above applications are incorporated herein by reference.

TECHNICAL FIELD

The invention relates to a method for constructing seismic wave velocity field; more particularly, the invention relates to a method for constructing a well-constrained transverse variable H-V curve in petroleum geophysical exploration.

BACKGROUND OF THE INVENTION

Research for the method of constructing velocity field in a complex area is a frontier research subject that long exists in petroleum geophysical exploration, and has not been completely solved. Currently, many theoretical and practical application achievements have been obtained, but the research mostly focuses on the following two aspects:

(1) Research on how to obtain more accurate average velocity field with seismic data The research mainly includes two aspects: firstly, improving calculation accuracy of iterative velocity, with methods of iterative weighted complex trace velocity analysis, iterative weighted inclination velocity analysis, etc.; secondly, improving calculation accuracy of interval velocity, with methods such as generalized Dix method and various velocity smoothing methods, etc. Since there are many factors that affect seismic velocity, the above methods though improve accuracy of velocity analysis to some extent, but cannot guarantee accurate average velocity field.

(2) Comprehensive study on average velocity field in accordance with seismic, logging and VSP data At present, said methods are main hotspots of research, and have achieved great research results and relatively wide applications. However, the research of such aspect mainly depends on an interpreter's experience, summarizing seismic velocity, logging and VSP data, which requires very heavy human workload. In addition, different interpreters would obtain seismic velocity field differing greatly from their own experience, and it is difficult to accurately constructing a subterranean velocity field.

The propagation velocity of a seismic wave in strata is related to factors of lithology of rock, porosity, burial depth, pore-fluid property, pore fluid pressure and external environment of the strata, and the like, wherein the lithology is the most important factor. Strata of different eras present difference in terms of lithology and porosity, and thus in terms of velocity. Generally, from new eras to old ones, the interval velocity of a stratum gradually increases.

In strata of the same era, particularly in marine bed, the lithology is common Generally, transverse variation of velocity is caused by two factors. One is transverse variation of sedimentary facies, resulting in the lithology changes transversely, so that the interval velocity also changes transversely. Theoretically, the interval velocity of a single compact rock is close to a determined value, but actual strata are not composed of "single" component, but formed by mixing different components, such as argillaceous sandstone, calcareous sandstone, and the like, which makes the velocity of a seismic wave have mixed transitional nature, depending on contents of various components. Besides, porosity, style of pore fillings and pore fluid pressure and the like also affect velocity. The other factor affecting the transverse variation of velocity is depth (pressure). Generally, the deeper burial, the more compact, the smaller porosity, and the faster velocity.

It is assumed that in the case the burial depth is the same, and the temperature, load pressure and the like conditions are the same or similar, relationship between velocity and depth, i.e. a compaction curve, can be calculated by a statistical method. When taking interval velocity of data of the respective measured points in a certain terrane as the X-axis, a depth thereof as the Y-axis, a normal velocity-depth curve (i.e. H-V curve) is obtained by fitting tendency that the velocity varies with the depth of the scattered points. Generally, the variation of velocity with depth can be described by a function of first degree, that is, the velocity is deemed to increase linearly with depth, represented by the following formula:

$$V = ah + b \tag{1}$$

wherein v is interval velocity, h is strata burial depth, and a, b are characteristic parameters of the velocity-depth curve (i.e. H-V curve).

Since there are lots of methods for acquiring subterranean velocity, there are lots of methods for acquiring a velocity-depth curve. For example, an interval velocity-depth curve can be obtained according to logging velocities of multiply wells; a velocity-depth curve can be obtained according to conversion interval velocities of multiple wells; or an interval velocity-depth curve can be obtained according to seismic velocity. Since there are many factors that affect the seismic velocity and the conversion velocity, among the plurality of curves, the interval velocity-depth curve obtained according to the logging interval velocities of multiple wells can best represent real subterranean conditions.

As mentioned above, the variation of velocity with depth can be described with a function of first degree, then whether the one velocity-depth curve can describe transverse velocity variation in a survey or not? The answer is no. This is because there are two main factors affecting transverse variation of velocity. The tendency that velocity changes with depth (pressure) can be described by value a of the above-mentioned velocity-depth curve. In a relatively small survey, the value a in the velocity-depth curve is relatively constant, particularly in the marine bed, the value a is almost constant. Thus in a relatively small survey, a fixed value a can be used to describe the tendency that velocity changes with depth (pressure). However, in a relatively large survey, the value a should be variable.

The other factor prominently affecting seismic interval velocity is transverse variation of sedimentary facies. Theoretically, the interval velocity of a single compact rock is close to a determined value, actually, strata are not composed of "single" component, but formed by mixing different components, such as argillaceous sandstone, calcareous sandstone, and the like, which makes the velocity of a seismic wave have mixed transitional nature, depending on contents of various components. Even if in a marine bed with relatively stable sedimentary facies, its ingredients are still different, but the velocity varies less relative to land strata. Besides, porosity, style of pore fillings and pore fluid pressure and the like also affect velocity. If the same function of first order is used to describe transverse variation of seismic velocity, the result is, even in a relatively small survey, the variation of value b is very large.

A basic conclusion is obtained from the above discussion, that is, variation of velocity with depth can be described with a function of first order, and the H-V curve varies transversely, but the variation tendency of value a and that of value b in the curve are different, wherein the value a is relatively constant, varies little transversely; whereas the value b is affected by many factors, varies violently transversely.

The above basic conclusion is commonly accepted, but the key point is how to apply the basic conclusion in practical complex velocity construction, i.e. how to construct a transverse variable H-V curve in the practical velocity construction. Especially, result of the complex velocity construction is generally to be used in practical time-depth conversion, the result of which should correspond to practical drilling result; therefore, construction of a transverse variable H-V curve has to be constrained by the drilling result.

SUMMARY OF THE INVENTION

In order to solve the above technical problems, the invention provides a method for constructing a well-constrained transverse variable H-V curve in the construction of seismic wave velocity field. Applying the invention to the construction of the seismic wave velocity field can guarantee the consistence between the velocity and a drilling conversion velocity at the location of a drilling well; and at a location without any well, the velocity has a variation tendency that is consistent with that of a seismic velocity, thus guaranteeing that an accurate average velocity field is obtained.

The invention is implemented by the following solutions.

A method for constructing a well-constrained transverse variable H-V curve in the construction of seismic wave velocity field, wherein in the velocity-depth curve, i.e., the H-V curve, variation of velocity with depth is described with a function of first degree, and the velocity linearly increases with depth, represented by a formula v=ah+b, wherein v is interval velocity, h is strata burial depth, and a, b are characteristic parameters of the velocity-depth curve; characterized in that, the velocity-depth curve is the well-constrained transverse variable H-V curve which can be constructed by the following steps:

A. calculating interval velocity of each strata (i.e. various geologic strata at a well location) in each well in a survey (i.e. the work area of seismic exploration) with an acoustic logging curve, and calculating a conversion interval velocity of each strata (i.e. various geologic strata at the well location) in each well with actual drilling result (i.e. actual depth of the strata);

B. with the coordinates of the well location in each strata in step A, drawing a circle with the point (coordinates of the well) as the center, with a certain radius (set by an operator, for example 3000 meters, etc.), and forming a set by all the well locations in the circle; if the number of wells in the set is smaller than a preset value, i.e. the minimal number of wells, enlarging the radius until the number of wells in the set is larger than or equals to the preset value, (generally the preset value is 4);

C. fitting a function of first degree regarding the variation of velocity with depth by regression analysis, according to the logging interval velocity of each well in the set, taking the value a (determined from the formula v=ah+b) of the function as the value a of the well location;

D. calculating value b from the formula v=ah+b according to the value a of the well location and the conversion interval velocity derived from step A, taking it as the value b of the well location;

E. gridding (i.e. using certain gridding method, that is interpolation) the value a obtained from step C and value b from step D, respectively, according to Kriging interpolation algorithm, so as to obtain value a and value b of each grid location in the whole survey, and forming the well-constrained transverse variable H-V curve in accordance with the formula v=ah+b.

The method for applying the well-constrained transverse variable H-V curve constructed in the invention to the construction of seismic wave velocity field comprises the following steps:

a. calculating proportional relationship between the value b of seismic interval velocity and the value b of drilling conversion velocity at the well location, i.e. proportional coefficient=value b of drilling conversion velocity/value b of seismic interval velocity, based on the constructed well-constrained transverse variable H-V curve and the established well-constrained transverse variable H-V curve;

b. obtaining a proportional coefficient of the whole survey by Kriging interpolation in transverse direction (which means each point extends in a plane);

c. multiplying the value b of seismic interval velocity of the whole work area by said proportional coefficient, to obtain seismic and multiple-well-constrained value b of the whole work area;

d. applying the value b obtained in step c in the above formula v=ah+b, velocity of each point can be obtained according to its value a, value b and depth data at each point, thus constructing the seismic wave velocity field.

Said well-constrained transverse variable H-V curve is processed with velocity inversion algorithm, comprising the following steps:

(1) using the comparatively interpreted horizon model and H-V curve, recursively deducing the initial depth of each CDP, by stripping layer by layer from shallow to deep in accordance with CDP point;

(2) iterating thickness of each strata with H-V curve function $v(h_{ij})=f(h_{ij})$ (wherein i is serial number of CDP, j is serial number of layer), i.e. calculating the depth from the seismic reflection time and the H-V curve function, modifying velocity according to difference between the calculated depth and H-V template depth; which process continues until the depth error satisfies its accuracy, the interval velocity and bottom depth of each layer at the point is obtained when the iteration converges;

(3) processing each CDP point in the same way, finally acquiring the interval velocity and bottom depth of each layer corresponding to each CDP.

For layer j of CDP i, the H-V curve function of which is $v(h_{ij})=f(h_{ij})$. Provided that depth $H_{i,j-1}$ of layer j-1 is known (the depth of layer 0 is fixed to zero), the inversion algorithm for calculating depth and velocity of layer j is as follows.

(1) Giving the initial thickness $h_{ij}=ho_{ij}$ of layer j;

(2) calculating the initial interval velocity $v_{ij}=f(ho_{ij})$ of layer j from the function $v(h_{ij})=f(h_{ij})$ of H-V curve of layer j;

(3) calculating theoretical reflection time difference $\Delta t=ho_{ij}/v_{ij}$ between layer j and layer j-1;

(4) assuming actual reflection time difference between layer j and layer j-1 is $\Delta T$ (which can be calculated from travel time in that strata); if the difference between the theoretical reflection time and actual reflection time $|\Delta t-\Delta T|<\epsilon$ ($\epsilon$ is a small preset value, commonly taking ½ sampling rate), $h_{ij}$ is the actual thickness of layer j, $v_{ij}$ is the actual interval velocity of layer j; when the process ends, inversion result is output;

(5) if $\Delta t-\Delta T<0$, indicating thickness $h_{ij}$ is relatively small, making $h_{ij}=h_{ij}+|\Delta t-\Delta T|.v_{ij}$, and turning to step (2); otherwise, if $\Delta t-\Delta T>0$, indicating thickness $h_{ij}$ is relatively large, making $h_{ij}=h_{ij}-|\Delta t-\Delta T|.v_{ij}$, and turning to step (2).

In order to improve calculation efficiency of the inversion algorithm, the initial thickness $h_{ij}$ of layer j can be the velocity of layer j of CDP i-1. Result of theoretical calculation and practical application shows that the algorithm has good convergence, and un-convergent condition is not met in our application. The method is not only suitable for time-depth conversion in gentle construction area, but also suitable for time-depth conversion in a highly steep and complex construction area. In addition, recursive inversion algorithm can determine and deal with fault (normal or reverse), totally controlled by the interpreted horizon model around the fault rather than affected by human factors, thus it can objectively recover shape of a footwall.

Advantages of the invention lie in that,

1. The velocity-depth curve constructed in the invention is a well-constrained transverse variable H-V curve, and the construction method is novel. Compared with the prior art, step C of the construction guarantees the variation tendency of velocity with depth to best correspond to actual conditions by using the value a obtained from a logging acoustic wave curve; use of conversion interval velocities of various wells in step D guarantees the velocity of a well location is totally identical to the actual conversion velocity, which thus guarantees the depth obtained from time-depth conversion conforms with actual drilling status; step E guarantees variation of value a and value b in the transverse direction is relatively gentle; in addition, the invention constructs seismic wave velocity field with steps a, b, c and d, compared with prior art, the invention guarantees consistence between the velocity and a drilling conversion velocity at the location of a drilling well in the velocity model; and at a location without a well, the velocity has a variation tendency that is consistent with that of a seismic velocity, thus guaranteeing that an accurate average velocity field is obtained. The invention further plays an active part in petroleum geophysical exploration.

DETAILED DESCRIPTION OF THE PREFERRED EMBODIMENTS

Embodiment 1

Figure 1:
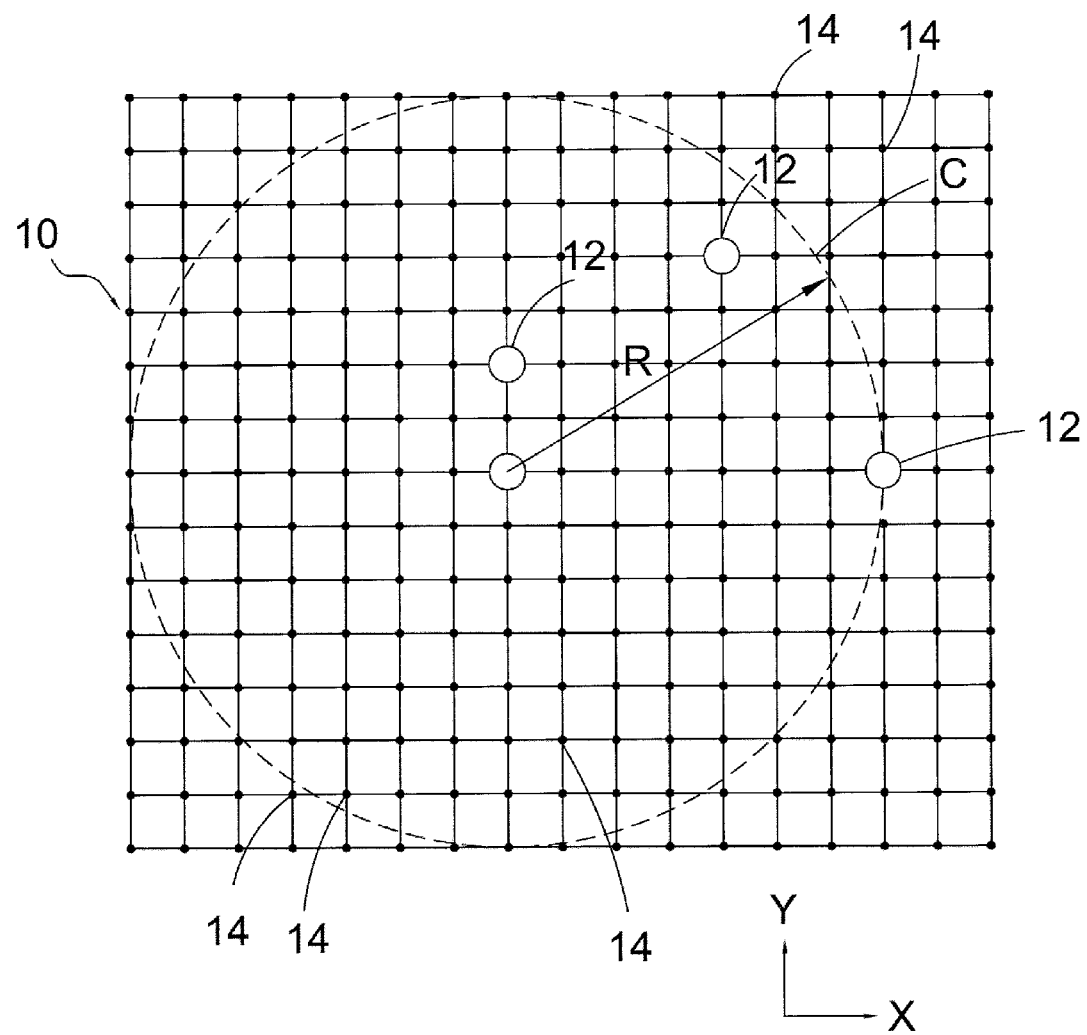
FIG. 1 is a schematic view of a survey area in which wells are located, wherein the survey area is gridded and projected onto an X-Y plane to form a plurality of grids in accordance with the teachings of the present disclosure.

Referring to FIG. 1, a survey area 10, which is the work area of seismic exploration, is shown to include, for example, four wells 12. The survey area 10 is gridded and projected onto an X-Y plane to form a plurality of grids 14. Each grid 14 includes information about velocity, time, characteristic parameters "a" and "b." The characteristic parameters "a" and "b" in the H-V curve for each well 12 will be obtained by actual drilling results, whereas the characteristic parameters "a" and "b" in the H-V curve for each grid 14 where a well 12 is not located, will be obtained by estimation based on interpolation and based on the characteristic parameters "a" and "b" actually obtained from the wells 12 in the survey area 10, which will be described in more detail below.

Figure 2:
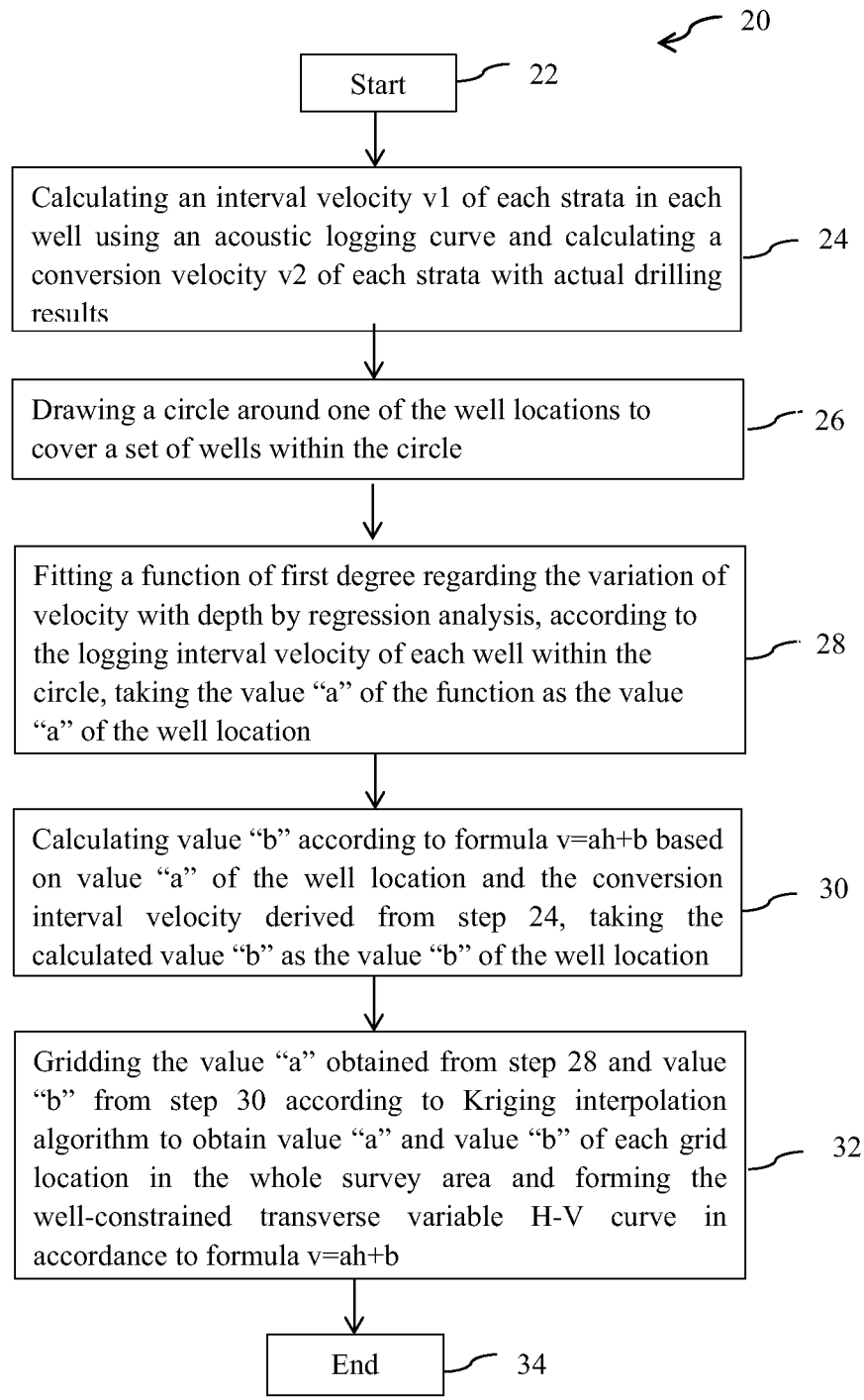
FIG. 2 is a flow diagram of a method of determining a well-constrained transverse variable H-V curve in accordance with the teachings of the present disclosure.

Referring to FIG. 2, the invention discloses a method 20 for determining a well-constrained transverse variable H-V curve for establishing seismic wave velocity field in determining a location (particularly a depth) of a petroleum reservoir in petroleum geophysical exploration. In petroleum geophysical exploration, it is desirable to determine the location, particularly the depth, of the petroleum reservoir. The location of the petroleum reservoir can be determined after the seismic wave velocity field is established. The seismic wave velocity field can be established based on a velocity-depth curve (i.e., the H-V curve). In the H-V curve, velocity varies with depth according to a function of first degree. In other words, the velocity linearly increases with depth, according to a formula $v=ah+b$, wherein v is an interval velocity, h is strata burial depth, and a, b are characteristic parameters of the velocity-depth curve. The method 20 is characterized in that the velocity-depth curve is the well-constrained transverse variable H-V curve. The method 20 starts in step 22 and includes the following steps:

A. calculating an interval velocity v1 of each strata (i.e. various geologic strata at a well location) in each well 12 in a survey area 10 (i.e. the work area of seismic exploration) with an acoustic logging curve, and calculating a conversion interval velocity v2 of each strata (i.e. various geologic strata at the well location) in each well 12 with actual drilling result (i.e. actual depth of the strata) in step 24;

B. with coordinates of the well location in each strata in step A (i.e., step 24), drawing a circle C with the point (coordinates of the well) as the center, with a certain radius R (set by an operator, for example 3000 meters, etc.), and forming a set by all the well locations in the circle in step 26; if the number of wells in the set is smaller than a preset value, i.e. the minimal number of wells 12, enlarging the radius until the number of wells 12 in the set is larger than or equals to the preset value, (generally the preset value is 4);

C. fitting a function of first degree regarding the variation of velocity with depth by regression analysis, according to the logging interval velocity of each well in the set, taking the value a (determined from the formula $v=ah+b$) of the function as the value a of the well location in step 28;

D. calculating value b from the formula $v=ah+b$ according to the value a of the well location and the conversion interval velocity derived from step A (i.e., step 24), taking it as the value b of the well location in step 30;

E. gridding (i.e. using certain gridding method, that is interpolation) the value a obtained from step C (i.e., step 28) and value b from step D (i.e., step 30), respectively, according to Kriging interpolation algorithm, so as to obtain value a and value b of each grid location in the whole survey area 10, and forming the well-constrained transverse variable H-V curve in accordance with the formula $v=ah+b$ in step 32.

The method 20 ends in step 34.

In other words, in step 32, the characteristic parameters "a" and "b" for all grids 14 where the wells 12 are not located are obtained by interpolation and by using the values "a" and "b" actually obtained at the locations of the wells 12. After obtaining values "a" and "b" at each grid 14 of the survey area 10, the well-constrained transverse variable H-V curve across the survey area 10 is obtained.

Figure 3:
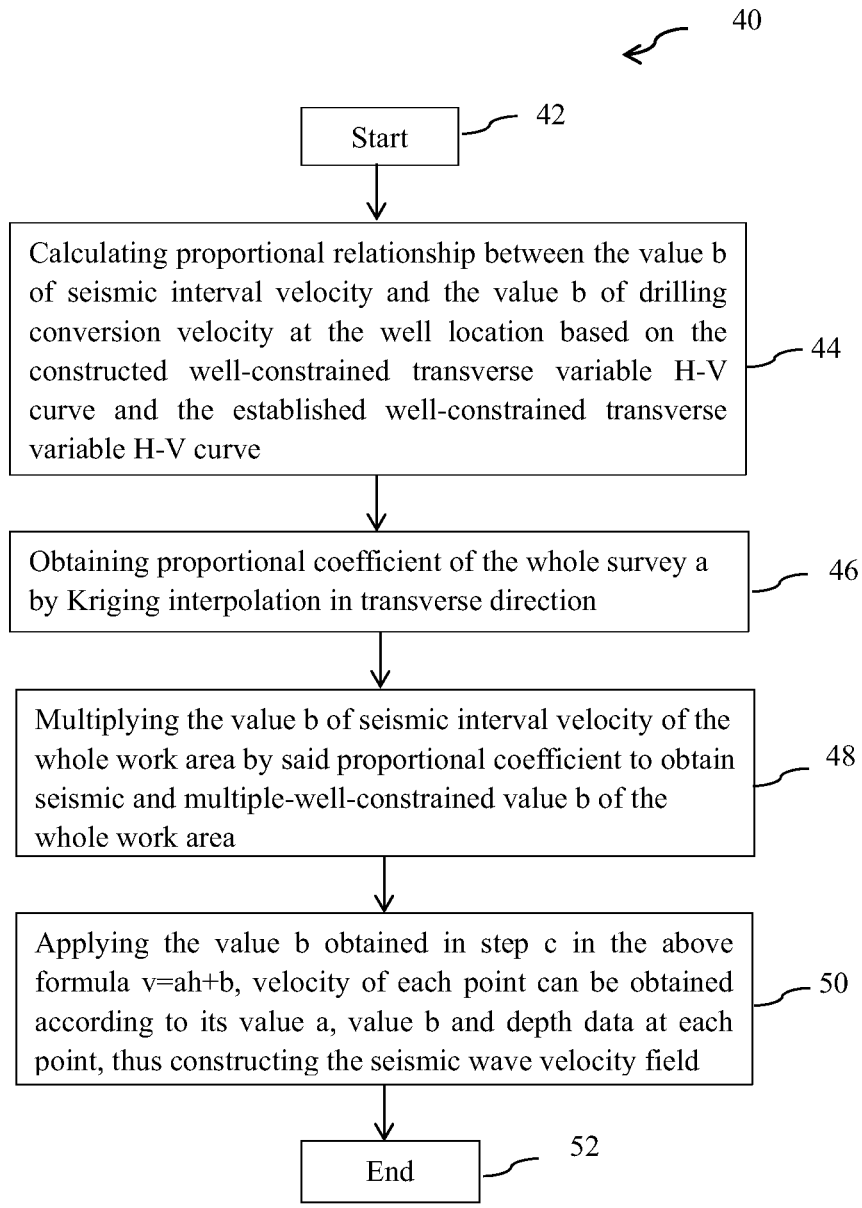
FIG. 3 is a flow diagram of a method of establishing seismic wave velocity field based on the well-constrained transverse variable H-V curve of FIG. 2 in accordance with the teachings of the present disclosure.

Referring to FIG. 3, a method 40 for establishing seismic wave velocity field based on the well-constrained transverse variable H-V curve obtained in FIG. 2 starts in step 42 and includes the following steps:

a. calculating proportional relationship between the value b of seismic interval velocity and the value b of drilling conversion velocity at the well location, i.e. proportional coefficient=value b of drilling conversion velocity/value b of seismic interval velocity, based on the constructed well-constrained transverse variable H-V curve and the established well-constrained transverse variable H-V curve in step 44;

b. obtaining proportional coefficient of the whole survey a by Kriging interpolation in transverse direction (which means each point extends in a plane) in step 46;

c. multiplying the value b of seismic interval velocity of the whole work area by said proportional coefficient, to obtain seismic and multiple-well-constrained value b of the whole work area in step 48;

d. applying the value b obtained in step c in the above formula v=ah+b, velocity of each point can be obtained according to its value a, value b and depth data at each point, thus constructing the seismic wave velocity field in step 50. The method 40 ends in step 52.

Embodiment 2

Another preferred embodiment of the invention is described hereafter.

1. In the prior art, establishment of an H-V curve is as follows.

Propagation velocity of a seismic wave in strata is related to factors of lithology of rock, porosity, burial depth, pore-fluid property, pore fluid pressure and external environment of the strata, and the like, wherein the lithology is the most important factor. Strata of different eras present difference in terms of lithology and porosity, and thus in terms of velocity. Generally from young era to old ones, the interval velocity of a stratum gradually increases.

In strata of the same era, particularly in marine bed, the lithology is common. Generally, transverse variation of velocity is caused by two factors. One is transverse variation of sedimentary facies, resulting in the lithology changes transversely, so that the interval velocity also changes transversely. Theoretically, the interval velocity of a single compact rock is close to a determined value, but actually strata are not composed of "single" component, but formed by mixing different components, for example argillaceous sandstone, calcareous sandstone, and the like, which makes the velocity of seismic wave have mixed transitional nature, depending on contents of various components. Besides, porosity, style of pore fillings and pore fluid pressure and the like also affect velocity. The other factor affecting the transverse variation of velocity is depth (pressure). Generally, the deeper burial, the more compact, the smaller porosity, and the faster velocity.

It is assumed that in the case the burial depth is the same, and the temperature, load pressure and the like conditions are the same or similar, relationship between velocity and depth, i.e. compaction curve, can be calculated by a statistical method. When taking interval velocity of data of the respective measured points in a certain terrane as the X-axis, a depth thereof as the Y-axis, a normal velocity-depth curve (i.e. H-V curve) is obtained by fitting tendency that the velocity varies with the depth of the scattered points. Generally the variation of velocity with depth can be described by a function of first degree, that is, the velocity is deemed to increase linearly with depth, represented by the following formula: v=ah+b, wherein v is interval velocity, h is strata burial depth, and a, b are characteristic parameters of the velocity-depth curve (i.e. H-V curve).

Since there are lots of methods for acquiring subterranean velocity, there are also lots of methods for acquire a velocity-depth curve. For example, an interval velocity-depth curve can be obtained according to logging interval velocities of multiply wells; an interval velocity-depth curve can be obtained according to conversion interval velocities of multiple wells; or an interval velocity-depth curve can be obtained according to seismic velocity. Since there are many factors that affect seismic velocity and conversion velocity, among the plurality of curves, the interval velocity-depth curve obtained according to the logging velocities of multiple wells can best represent real subterranean conditions.

2. Well-constrained transverse variable H-V curve

As mentioned above, the variation of velocity with depth can be described with a function of first degree, then whether the one velocity-depth curve can describe transverse velocity variation in a work area or not? The answer is no. This is because there are two main factors affecting transverse variation of velocity. The tendency that velocity changes with depth (pressure) can be described by value a of the above-mentioned velocity-depth curve. In a relatively small work area, the value a in the velocity-depth curve is relatively constant, particularly in the marine bed, the value a is almost constant. Thus in a relatively small work area, a fixed value a can be used to describe the tendency that velocity changes with depth (pressure). However, in a relatively large work area, the value a should be variable.

The other factor prominently affecting seismic interval velocity is transverse variation of sedimentary facies. Theoretically, the interval velocity of a single compact rock is close to a determined value, but actual strata are not composed of "pure" components, but formed by mixing different components, for example argillaceous sandstone, calcareous sandstone, and the like, which makes the velocity of seismic wave have mixed transitional nature, depending on contents of various components. Even if in a marine bed with relatively stable sedimentary facies, its ingredients are still different, but the velocity varies less relative to land strata. Besides, porosity, style of pore fillings and pore fluid pressure and the like also affect velocity. If the same function of first order is used to describe transverse variation of seismic velocity, the result is even in a relatively small work area, the variation of value b is very large.

A basic conclusion is obtained from the above discussion, that is, variation of velocity with depth can be described with a function of first order, and the H-V curve varies transversely, but the variation tendency of value a and that of value b in the curve are different, wherein the value a is relatively constant, varies little transversely; whereas the value b is affected by many factors, varies violently transversely.

The above basic conclusion is commonly accepted, but the key point is how to apply the basic conclusion in practical complex velocity construction, i.e. how to construct a transverse variable H-V curve in the practical velocity construction. Especially, result of the complex velocity construction is generally to be used in practical time-depth conversion, the result of which should correspond to practical drilling result; therefore, construction of a transverse variable H-V curve has to be constrained by the drilling result. Thus we propose a method for constructing well-constrained transverse variable H-V curve, comprising the following steps:

A. calculating interval velocity of each strata (i.e. various geologic strata at a well location) in each well in a survey (i.e. the work area of seismic exploration) with an acoustic logging curve, and calculating a conversion interval velocity of each strata (i.e. various geologic strata at the well location) in each well with actual drilling result (i.e. actual depth of the strata);

B. with the coordinates of the well location in each strata in step A, drawing a circle with the point (coordinates of the well) as the center, with a certain radius (set by an operator, for example 3000 meters, etc.), and forming a set by all the well locations in the circle; if the number of wells in the set is smaller than a preset value, i.e. the minimal number of wells, enlarging the radius until the number of wells in the set is larger than or equals to the preset value, (generally the preset value is 4)

C. fitting a function of first degree regarding the variation of velocity with depth by regression analysis, according to the logging interval velocity of each well in the set, taking the value a (determined from the formula v=ah+b) of the function as the value a of the well location;

D. calculating value b from the formula v=ah+b according to the value a of the well location and the conversion interval velocity derived from step A, taking it as the value b of the well location;

E. gridding (i.e. using certain gridding method, that is interpolation) the value a obtained from step C and value b from step D, respectively, according to Kriging interpolation algorithm, so as to obtain value a and value b of each grid location in the whole work area. Thus H-V linear relation, i.e. v=ah+b, is obtained for each point in the survey. Because the value a and the value b at each location are different, the H-V curve is named traverse variable H-V curve, and the well-constrained transverse variable H-V curve is formed in accordance with the formula v=ah+b.

3. Velocity inversion algorithm constrained by a transverse variable H-V curve

Figure 4:
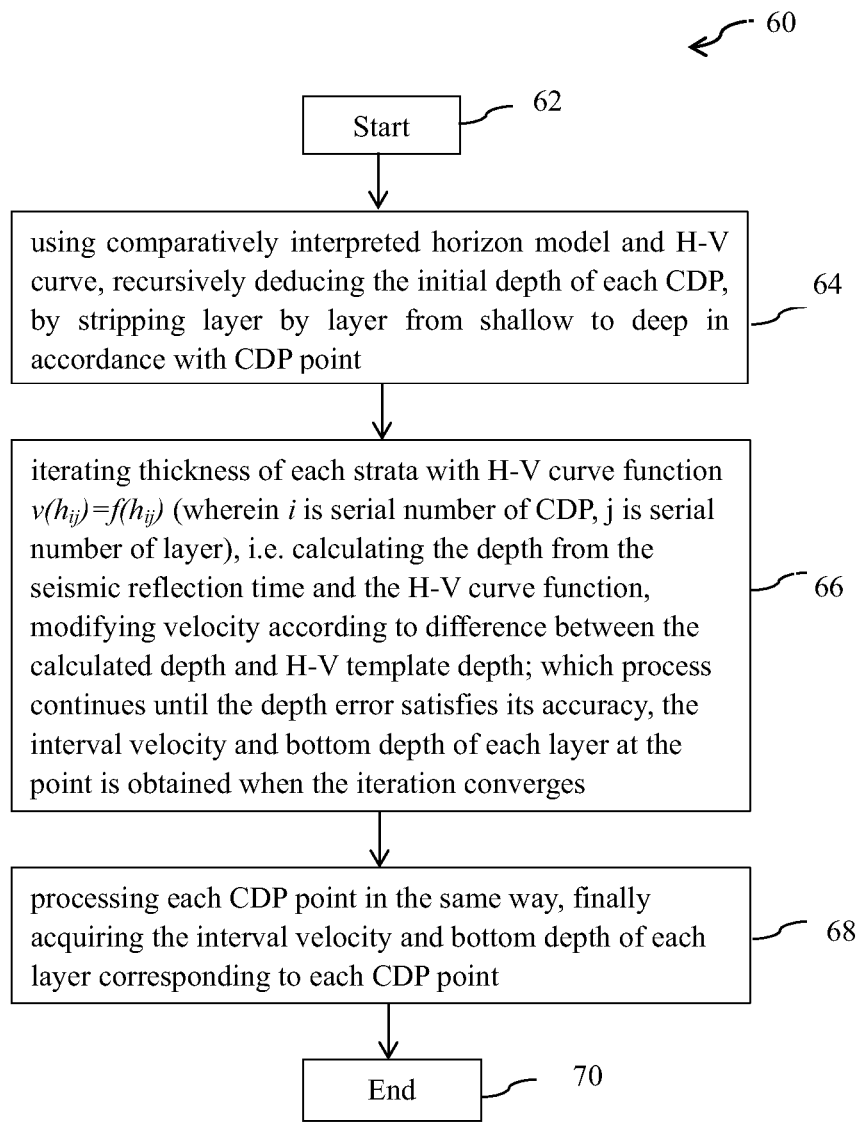
FIG. 4 is a flow diagram of a method of determining a velocity in the well-constrained transverse variable H-V curve by a velocity inversion algorithm in accordance with the teachings of the present disclosure.

In actual time-depth conversion, seismic refection time is known, but reflection depth is unknown, thus the above method cannot be directly cited. The seismic reflection time has to be transformed into reflection depth which is exactly the target of time-depth conversion. Therefore, referring to FIG. 4, the method 60 of determining a velocity based on a velocity inversion algorithm constrained by a transverse variable H-V curve starts in step 62 and comprising the following steps:

(1) using comparatively interpreted horizon model and H-V curve, recursively deducing the initial depth of each CDP, by stripping layer by layer from shallow to deep in accordance with CDP point in step 64;

(2) iterating thickness of each strata with H-V curve function $v(h_{ij})=f(h_{ij})$ (wherein i is serial number of CDP, j is serial number of layer), i.e. calculating the depth from the seismic reflection time and the H-V curve function, modifying velocity according to difference between the calculated depth and H-V template depth; which process continues until the depth error satisfies its accuracy, the interval velocity and bottom depth of each layer at the point is obtained when the iteration converges in step 66;

(3) processing each CDP point in the same way, finally acquiring the interval velocity and bottom depth of each layer corresponding to each CDP point in step 68.

The method 60 ends in step 70.

For layer j of CDP i, the H-V curve function of which is $v(h_{ij})=f(h_{ij})$. Provided that depth $H_{i,j-1}$ of layer j-1 is known (the depth of layer 0 is fixed to zero), the inversion algorithm for calculating depth and velocity of layer j is as follows.

Giving the initial thickness $h_{ij}=ho_{ij}$ of layer j;

calculating the initial interval velocity $v_{ij}=f(ho_{ij})$ of layer j from the function $v(h_{ij})=f(h_{ij})$ of H-V curve of layer j;

calculating theoretical reflection time difference $\Delta t=ho_{ij}/v_{ij}$ between layer j and layer j-1;

assuming actual reflection time difference between layer j and layer j-1 is $\Delta T$ (which can be calculated from travel time in that strata); if the difference between the theoretical reflection time and actual reflection time $|\Delta t-\Delta T|<\epsilon$ ($\epsilon$ is a small preset value, commonly taking ½ sampling rate), $h_{ij}$ is the actual thickness of layer j, $v_{ij}$ is the actual interval velocity of layer j; when the process ends inversion result is output;

if $\Delta t-\Delta T<0$, indicating thickness $h_{ij}$ is relatively small, making $h_{ij}=h_{ij}+|\Delta t-\Delta T|.v_{ij}$, and turning to step (2); otherwise, if $\Delta t-\Delta T>0$, indicating thickness $h_{ij}$ is relatively large, making $h_{ij}=h_{ij}|\Delta t-\Delta T|.v_{ij}$, and turning to step (2) (i.e., step 66).

The method 60 ends in step 70.

In order to improve calculation efficiency of the inversion algorithm, the initial thickness $h_{ij}$ of layer j can be the velocity of layer j of CDP i-1. Result of theoretical calculation and practical application shows that the algorithm has good convergence, and un-convergent condition is not met in our application. The method is not only suitable for time-depth conversion in a gentle construction area, but also suitable for time-depth conversion in a highly steep and complex construction area. In addition, recursive inversion algorithm can determine and deal with fault (normal or reverse), totally controlled by the interpreted horizon model around the fault rather than affected by human factors, thus it can objectively recover shape of a footwall.

4. A method for constructing well-constrained transverse variable H-V curve in the construction of seismic wave velocity field The key to realize the method for constructing well-constrained transverse variable H-V curve in the construction of seismic wave velocity field is to integrate seismic interval velocity and drilling conversion velocity, i.e. to integrate various velocities. Considering the problem like this, if the effect of depth (compactness) on velocity in seismic interval velocity and drilling conversion velocity is eliminated, main factor causing velocity variation in transverse direction is the transverse variation of sedimentary facies, which is variation of value b in the depth-velocity curve. The transverse variation of sedimentary facies is slow, thus variation of value b is also slow. If a proportional relationship between value b of seismic interval velocity and value b of drilling conversion velocity is described by a proportional coefficient, the proportional coefficient should vary slowly. Of course, the proportional coefficient is affected by various interference factors, and there may be mutation at certain position, but the total tendency is slowly variable. Regarding complex velocity model construction, the value b caused by pores, cracks, fillings and the like can be ignored, and only transverse variation of velocity caused by transverse variation of sedimentary facies is considered. It is derived from this the basic process for constructing seismic wave velocity field is as follows.

According to years of experience, it is considered the variation of velocity with depth can be described by a function of first order, i.e. velocity increases linearly with depth, and the function of first order can eliminate the effect of depth (compactness) on velocity:

a. based on the constructed well-constrained transverse variable H-V curve and the established well-constrained transverse variable H-V curve, calculating proportional relationship between the value b of seismic interval velocity and the value b of drilling conversion velocity at the well location, i.e. proportional coefficient=value b of drilling conversion velocity/value b of seismic interval velocity;

b. obtaining a proportional coefficient of the whole survey through Kriging interpolation in transverse direction (which means each point extends in a plane);

c. multiplying the value b of seismic interval velocity of the whole work area by said proportionality coefficient, to obtain seismic and multiple-well-constrained value b of the whole work area;

d. applying the value b obtained in step c in the above formula v=ah+b, to obtain velocity of each point according to its value a and value b and depth data at each point, thus constructing the seismic wave velocity field.

What is claimed is:

1. A method for determining a location of a petroleum reservoir based on a seismic wave velocity field, the seismic wave velocity field being established based on a well-constrained transverse variable H-V curve, wherein in the velocity-depth curve (the H-V curve), velocity varies with depth according to a function of first degree, and the velocity linearly increases with the depth, according to a formula v=ah+b, wherein v is an interval velocity, h is a strata burial depth, and a, b are characteristic parameters of the velocity-depth curve;

characterized in that the velocity-depth curve is a well-constrained transverse variable H-V curve, and the well-constrained transverse variable H-V curve is determined by the following steps:

A. drilling a plurality of wells, measuring actual depth of strata in each well to obtain actual drilling result, calculating the interval velocity of each strata in each well in a survey area with an acoustic logging curve, and calculating a conversion interval velocity of each stratum in each well with the actual drilling result, said survey area refers to the work area of seismic exploration, said each strata in each well refers to various geologic strata at a well location, and said actual drilling result refers to the actual depth of the strata;

B. with coordinates of the well location in each strata in step A, drawing a circle with said coordinates as the center, and forming a set by all the well locations in the circle; if the number of wells in the set is smaller than a preset value, enlarging the radius until the number of wells in the set is larger than or equal to the preset value;

C. fitting the function of first degree regarding the variation of velocity with depth by regression analysis, according to the logging interval velocity of each well in the set of step B, taking the value a of the function as the value a of the well location;

D. calculating value b from the formula v=ah+b, according to the value a of the well location and the conversion interval velocity derived from step A, taking said value b as the value b of the well location;

E. gridding the value a obtained from step C and value b from step D, respectively, according to Kriging interpolation algorithm to form a plurality of grid locations across the survey area and to obtain value a and value b of each grid location in the whole survey area, and forming the well-constrained transverse variable H-V curve in accordance with the formula v=ah+b.

2. The method according to claim 1, wherein the seismic wave velocity field is established by using the well-constrained transverse variable H-V curve and by the following steps:

a. calculating proportional relationship between the value b of seismic interval velocity and the value b of drilling conversion velocity at the well location (proportional coefficient=value b of drilling conversion velocity/value b of seismic interval velocity), based on the constructed well-constrained transverse variable H-V curve and the established well-constrained transverse variable H-V curve;

b. obtaining proportional coefficient of the whole survey by Kriging interpolation in transverse direction, said transverse direction means each point extends in a plane;

c. multiplying the value b of seismic interval velocity of the whole work area by said proportionality coefficient, to obtain seismic and multiple-well-constrained value b of the whole work area;

d. applying the value b obtained in step c in the above formula v=ah+b, velocity of each point can be obtained according to its value a, value b and depth data at each point, thus constructing the seismic wave velocity field.

3. The method according to claim 1, wherein the well-constrained transverse variable H-V curve is processed by a velocity inversion algorithm and by the following steps:

(1) using comparatively interpreted horizon model and H-V curve, recursively deducing the initial depth of each CDP, by stripping layer by layer from shallow to deep in accordance with the CDP point;

(2) iterating thickness of each strata with H-V curve function $v(h_{ij})=f(h_{ij})$, wherein i is serial number of CDP, j is serial number of layer, calculating the depth from the seismic reflection time and the H-V curve function, modifying velocity according to difference between the calculated depth and H-V template depth; which process continues until the depth error satisfies its accuracy, the interval velocity and bottom depth of each layer at the point is obtained when the iteration converges;

(3) processing each CDP point in the same way, finally acquiring the interval velocity and bottom depth of each layer corresponding to each CDP point.

* * * * *